(12) United States Patent
de JD Melhado-Moya (10) Patent No.: US 12,297,984 B2
(45) Date of Patent: May 13, 2025

(54) LIGHTING APPARATUS WITH ADJUSTABILITY BETWEEN TWO LIGHTING STRUCTURES AND METHOD OF USE

(71) Applicant: Flex-N-Gate Advanced Product Development, LLC, Windsor (CA)

(72) Inventor: Felipe de JD Melhado-Moya, Novi, MI (US)

(73) Assignee: Flex-N-Gate Advanced Product Development, LLC, Windsor (CA)

( * ) Notice: Subject to any disclaimer, the term of this patent is extended or adjusted under 35 U.S.C. 154(b) by 0 days.

(21) Appl. No.: 18/611,852

(22) Filed: Mar. 21, 2024

(65) Prior Publication Data

US 2024/0318810 A1 Sep. 26, 2024

Related U.S. Application Data

(60) Provisional application No. 63/491,430, filed on Mar. 21, 2023.

(51) Int. Cl.
| | |
|---|---|
| *F21V 19/02* | (2006.01) |
| *B60Q 1/00* | (2006.01) |
| *B60Q 1/04* | (2006.01) |
| *B60Q 1/068* | (2006.01) |
| *B60Q 1/26* | (2006.01) |

(Continued)

(52) U.S. Cl.
CPC ............ *F21V 19/02* (2013.01); *B60Q 1/0041* (2013.01); *B60Q 1/04* (2013.01); *B60Q 1/0683* (2013.01); *B60Q 1/2642* (2013.01); *F21S 41/321* (2018.01); *F21S 41/36* (2018.01); *B60Q 2200/34* (2013.01)

(58) Field of Classification Search
CPC ...... F21S 41/36; F21S 41/675; B60Q 1/0683; B60Q 1/0041
See application file for complete search history.

(56) References Cited

U.S. PATENT DOCUMENTS

| | | | |
|---|---|---|---|
| 4,675,793 A | 6/1987 | Capellari et al. | |
| 5,095,411 A | 3/1992 | Peck et al. | |

(Continued)

FOREIGN PATENT DOCUMENTS

| | | |
|---|---|---|
| CN | 109964052 B | 7/2019 |
| DE | 4418135 A1 | 11/1995 |

(Continued)

OTHER PUBLICATIONS

Extended European Search Report issued Jun. 27, 2024 in European Patent Application No. 24165097.7.

*Primary Examiner* — William N Harris
(74) *Attorney, Agent, or Firm* — Avek IP, LLC (57) ABSTRACT

A lighting apparatus for use with a motor vehicle includes a frame forming an opening between at least a first side and a second side; a first lighting structure fixedly secured within the opening of the frame; a second lighting structure positioned within the opening and connected to the first lighting structure via a connector; and an adjustment device engaged with the second lighting structure, the adjustment device to apply force to the second lighting structure such that the connector flexes and allows the second lighting structure to adjust relative to the first lighting structure to move between a first position and a second position.

15 Claims, 5 Drawing Sheets

(51) Int. Cl.
 *F21S 41/32* (2018.01)
 *F21S 41/36* (2018.01)

(56) References Cited

U.S. PATENT DOCUMENTS

| | | |
|---|---|---|
| 6,969,184 B2 | 11/2005 | Bergman et al. |
| 9,475,421 B2 * | 10/2016 | Burton .................... F21S 41/39 |
| 10,300,838 B2 | 5/2019 | Greene et al. |
| 11,161,449 B2 | 11/2021 | Fladhammer et al. |
| 2013/0215632 A1 | 8/2013 | Jackl et al. |
| 2016/0159271 A1 * | 6/2016 | Helwig .................... B60Q 1/08 |
| | | 362/463 |
| 2019/0176681 A1 | 6/2019 | Fladhammer |
| 2022/0107050 A1 * | 4/2022 | Fladhammer .......... F16M 11/18 |
| 2023/0080944 A1 * | 3/2023 | Strate ...................... F21S 41/39 |

FOREIGN PATENT DOCUMENTS

| | | |
|---|---|---|
| EP | 2906871 A1 | 8/2015 |
| EP | 3680548 A1 | 7/2020 |

* cited by examiner

LIGHTING APPARATUS WITH ADJUSTABILITY BETWEEN TWO LIGHTING STRUCTURES AND METHOD OF USE

CROSS-REFERENCE TO RELATED APPLICATIONS

This application claims the benefit of priority of U.S. Provisional Patent Application No. 63/491,430, filed on Mar. 21, 2023, the disclosure of which is herein incorporated by reference in its entirety.

BACKGROUND

1. Field

Embodiments of the disclosure relate to lighting systems, and in particular to a lighting apparatus with at least two structures secured together with a flexible connector to provide adjustability of one structure relative to the second structure.

2. Related Art

Vehicle lighting systems are known in the art. For example, U.S. Pat. No. 6,969,184B2 to Bergman et al. discloses an adjustable vehicle headlamp with a threaded adjustment mechanism for adjusting a position of the headlamp and therefore the direction of light. U.S. Pat. No. 4,675,793A to Capellari et al. discloses an adjustable headlight with a rotatable connector for adjusting both the horizontal and vertical orientation of a reflector. U.S. Pat. No. 5,095,411A to Peck et al. discloses a headlamp adjustment assembly with an adjustment means for altering a position of the reflector within a casing to adjust the headlight beam.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In some aspects, the disclosure relates to a lighting apparatus for use with a motor vehicle. The lighting apparatus includes a frame forming an opening between at least a first side and a second side; a first lighting structure fixedly secured within the opening of the frame; a second lighting structure positioned within the opening and connected to the first lighting structure via a connector; and an adjustment device engaged with the second lighting structure. The adjustment device is configured to apply force to the second lighting structure such that the connector flexes and allows the second lighting structure to adjust relative to the first lighting structure to move between a first position and a second position.

In other aspects, the disclosure relates to a method of adjusting a lighting apparatus. The method includes manufacturing the lighting apparatus with a frame forming an opening between at least a first side and a second side, a first lighting structure fixedly secured within the opening of the frame, a second lighting structure positioned within the opening and connected to the first lighting structure via a connector, and an adjustment device engaged with the second lighting structure. Installing the lighting apparatus into an environment of a vehicle, wherein the first lighting structure is in a fixed position relative to the frame and the second lighting structure is in a first position relative to the first lighting structure. Testing the lighting apparatus by activating light and observing where the light is cast away from the first lighting structure and the second lighting structure. Adjusting the second lighting structure into a second position relative to the first lighting structure via the adjustment device, wherein the connector flexes due to force applied from the adjustment device through the second lighting structure and to the connector, thereby allowing the second lighting structure to move into the second position.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Lighting systems are well known in the art and include a variety of lighting apparatuses specifically designed for motor vehicles. These include headlights, taillights, interior lights, door lights, etcetera. Headlights for vehicles may be classified as either reflectors or projectors and function to reflect or project light onto a roadway during less-than-ideal driving conditions, such as low light. Headlights, and other lighting apparatuses, usually require a form of adjustability to direct the light beam to desired locations. For example, depending on the vehicle, a light beam may need to be adjusted for optimal visibility and safety. This may be done during a manufacturing stage, installation stage, or even after market of the vehicle. Conventional systems may utilize a plurality of components, manufactured separately, to create a complete system with one or more means of adjustability.

As is known in the art, systems and apparatuses that require multiple manufactured components, and/or multiple connection points for providing adjustability, are lacking in efficiency. Accordingly, designs configured to reduce a number of components or steps of manufacturing improve efficiency.

The present invention is directed toward a lighting apparatus which includes a frame for mounting the lighting apparatus in a desired environment, such as within a headlight casing of a vehicle. A first lighting structure is fixedly secured within and to the frame, and a second lighting structure is substantially disconnected from the frame and secured to the first lighting structure via a flexible connector. The second lighting structure is adjustable relative to the first lighting structure via an adjustment device. In other words, the second lighting structure is manipulated in position due to being connected to the first lighting structure, while being substantially free from other points of connection (i.e. to the frame). In embodiments, the adjustment device is a threaded fastener configured to manipulate the second lighting structure such that the connector between the two lighting structures flexes as needed to allow for movement of the second lighting structure.

FIGS. 1 through 4 depict a lighting apparatus 10 in accordance with the present disclosure. Apparatus 10 includes a frame 100 extending from a top end 102 to a bottom end 104 and from a first side 106 to a second side 108. The frame 100 forms a central opening 110 and can vary in shape and size as would be appropriate for a variety of installation environments of the lighting apparatus 10. The frame 100 provides a structure for mounting to a desired installation site, such as a headlamp cavity of a vehicle, wherein the frame 100 may receive installation hardware, such as screws, bolts, adhesives, etc.

Apparatus 10 further includes a first lighting structure 112 fixedly secured to the frame 100 within the opening 110. As shown, in embodiments, the first lighting structure 112 is fully integral with the frame 100 such that the structure 112 is connected on three sides 114a-c to the frame 100. Accordingly, the structure 112 is immovable relative to the frame 100 and is in a fixed position once the frame 100 is mounted. Although the contact locations between the structure 112 and the frame 100 are shown as solid connections, it is contemplated that gaps, openings, or other variations may be implemented so long as the structure 112 remains fixed.

Figure 1:
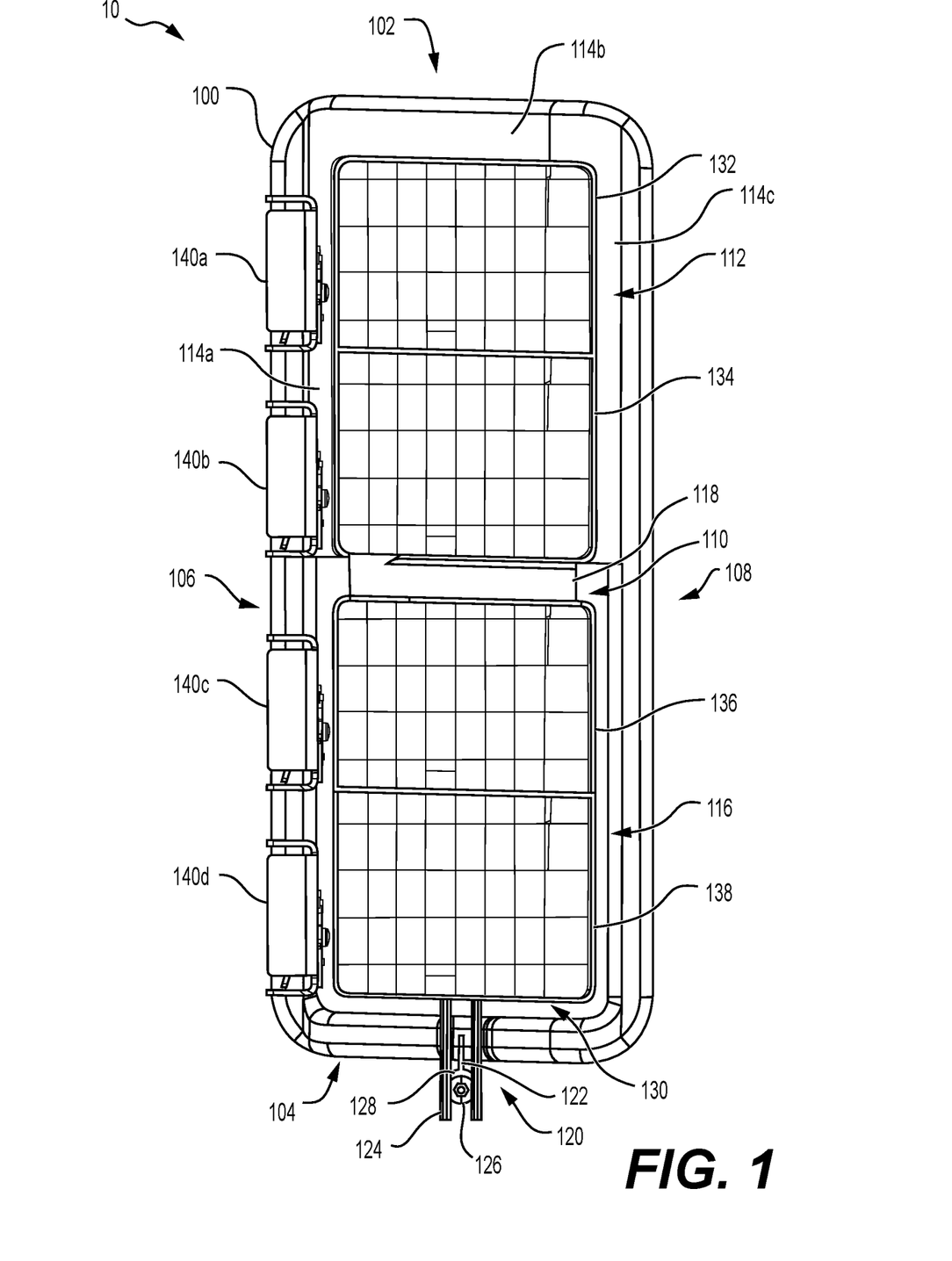
FIG. 1 is a front view of an embodiment of a lighting apparatus in accordance with the present invention.
Figure 2:
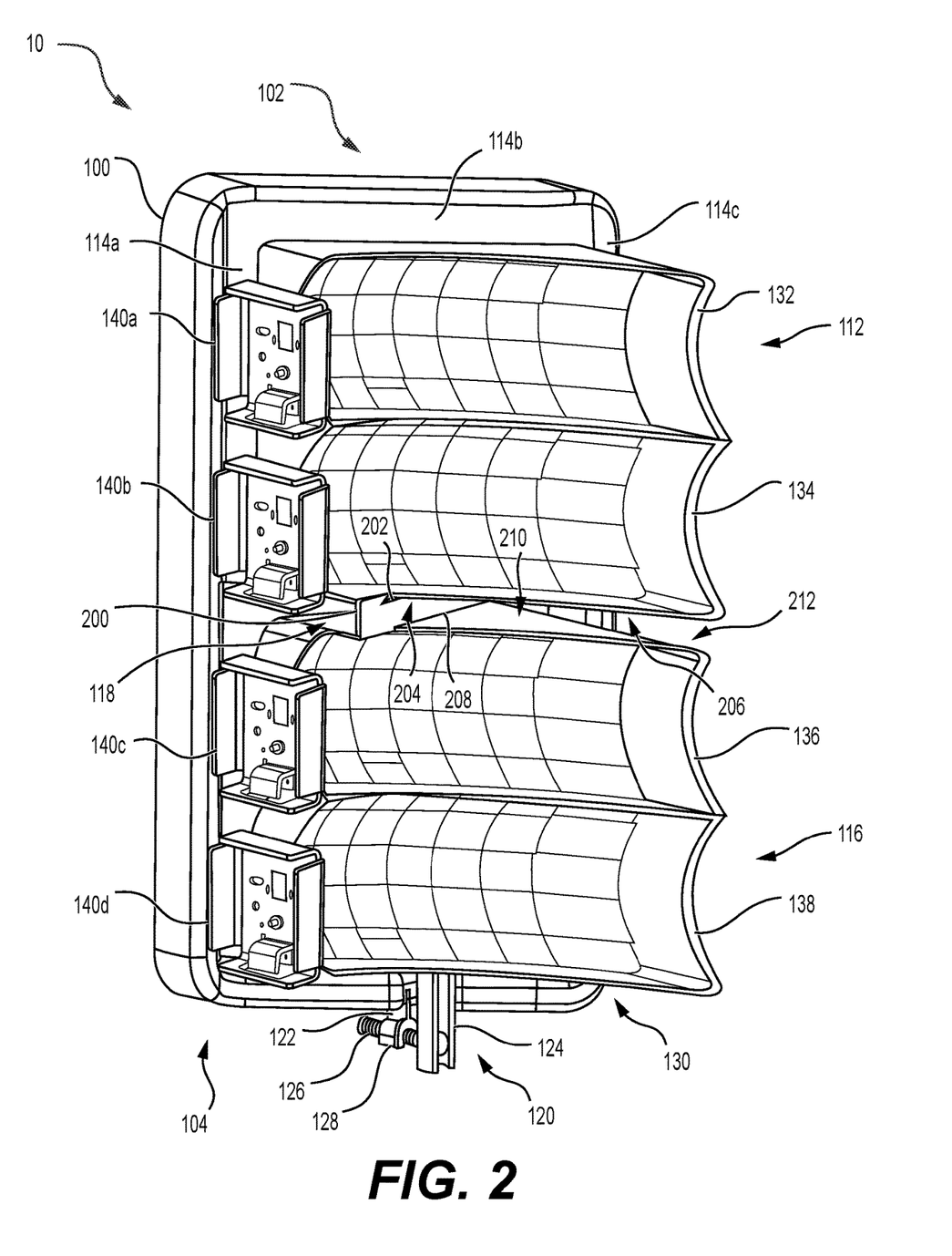
FIG. 2 is a front angled view of the lighting apparatus of FIG. 1.
Figure 3:
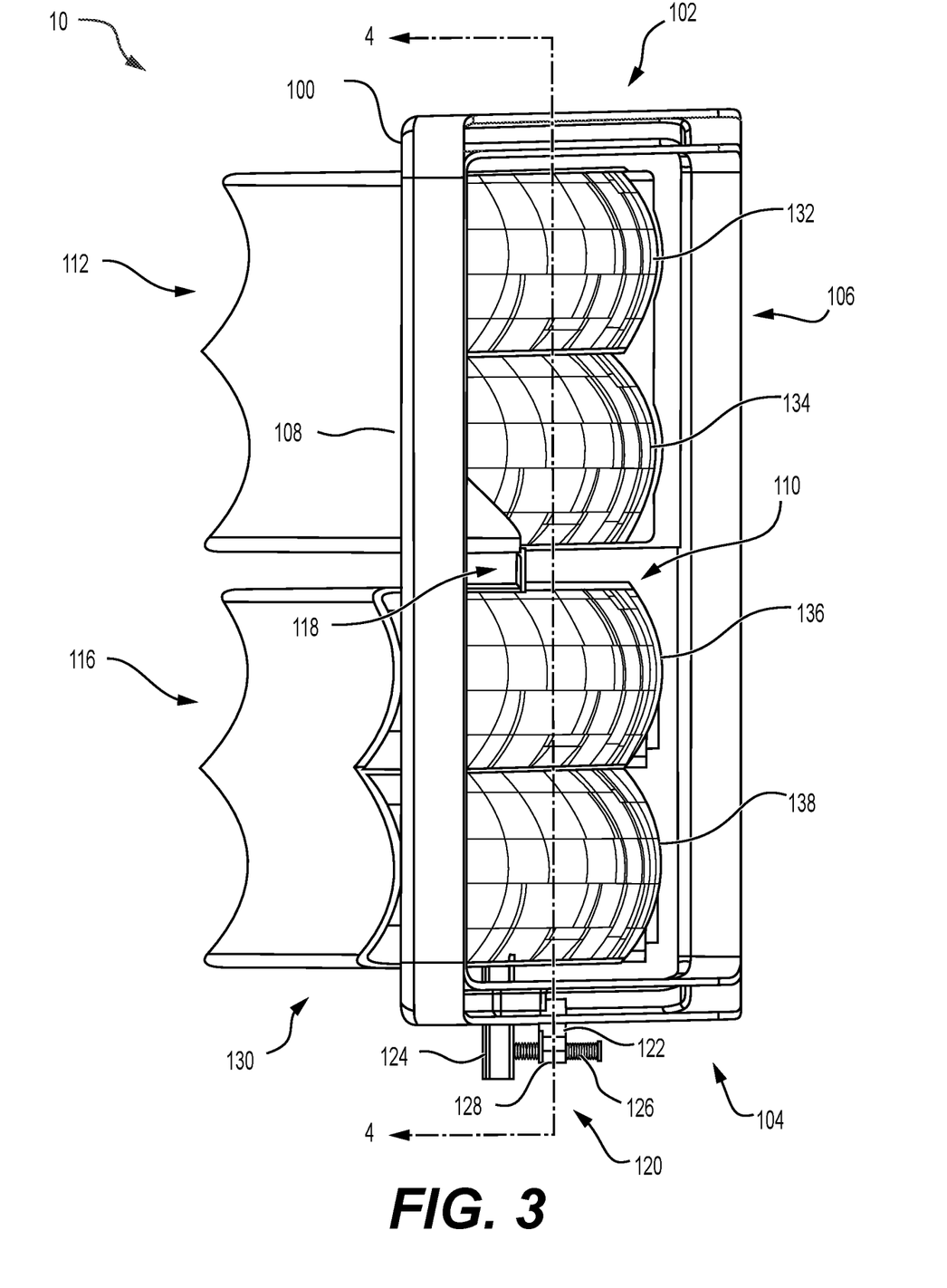
FIG. 3 is a back angled view of the lighting apparatus of FIG. 1.
Figure 4:
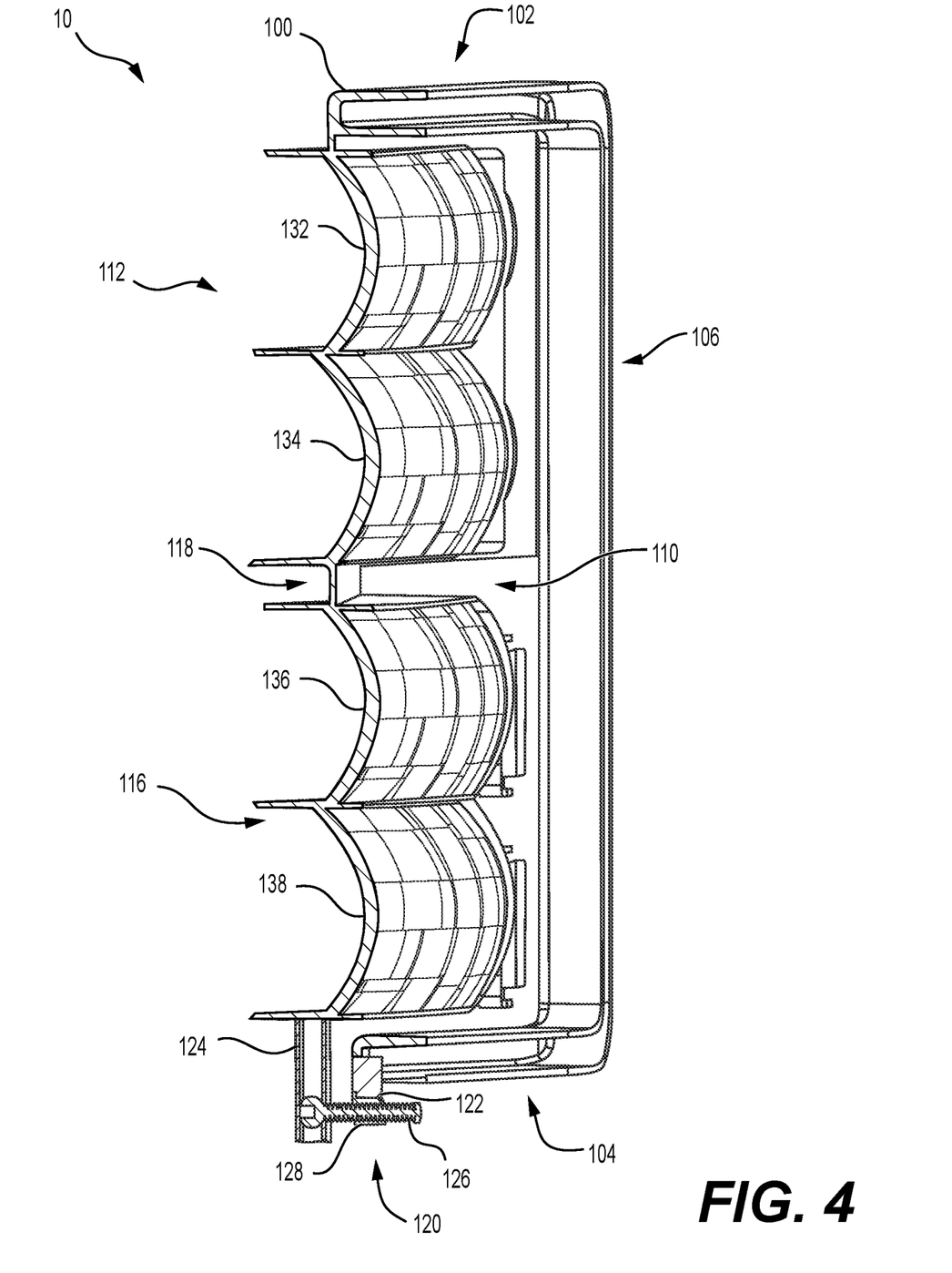
FIG. 4 is a back angled, cross-sectional view taken from line 4 of FIG. 3.

A second lighting structure 116 is positioned substantially within the opening of the frame 100 and is secured to and extends from the first lighting structure 112 via a connector 118. Structure 116 is substantially free from the frame 100 which allows for the structure 116 to move and flex via the connector 118. In embodiments, the connector 118 is composed of a material and structured in such a way as to provide flexible movement between the structures 112, 116. As best shown in FIG. 2, the connector 118 includes a body 200 that forms a top edge 202 which travels along a bottom surface 204 of a bottom end 206 of the first structure 112. Further, the connector 118 includes a bottom edge 208 which travels along a top surface 210 of a top end 212 of the second structure 116. This configuration uses enough contact surface of the connector 118 to prevent damage or breaking of the connector 118, while still allowing for a flexible connection between the two structures 114, 116.

In embodiments, the apparatus 10 further includes an adjustment device 120 mounted to the frame 100 and the second structure 116. The adjustment device 120, in embodiments, includes a fastener mount 122 rigidly secured to and extending from the frame 100, a receiver 124 extending from the second structure 116, and a threaded fastener 126 (e.g. screws and bolts) engaged with the fastener mount 122 and the receiver 124 such that adjustment/rotation of the fastener 126 manipulates the second structure 116 via the receiver 124. The mount 122, in embodiments, extends from the bottom end 104 of the frame 100 and includes a threaded portion 128, which may be C-shaped as shown, or may vary in shape as would be understood by those skilled in the art, and engages with the threads of the fastener 126 as the fastener 126 rotates. The receiver 124 is rigidly affixed to the second structure 116 and in embodiments, extends from a bottom end 130, such that as the fastener 126 rotates and therefore applies force to the second structure 116, the second structure 116 will flex/bend about the connector 118 to move into a new position. For example, as the fastener 126 is tightened, the bottom end 130 will be pulled closer to the frame 100, thereby altering the location of the structure 116 and an angle of light projection or reflection. The adjustment device 120, in combination with the connector 118, allows for the second structure 116 to be micro-adjusted relative to the first structure 112.

In embodiments, the first structure 112, second structure 116, connector 118, mount 122, and receiver 124 are all manufactured as a single unit out of a single material, such as through injection molding or other manufacturing practices. The material used would be any material appropriate as selected by those skilled in the art, such as one or more plastics. This improves efficiency of the manufacturing process, while still providing a means to adjust the lighting apparatus 10.

Those skilled in the art would understand that the lighting apparatus 10 may vary, while still incorporating the adjustment device 120 and connector 118 discussed above. Specifically, the lighting apparatus 10 may be a headlamp or other vehicle lighting apparatus and may further vary in design, such as through use of reflector components or projector components.

For purposes of explanation, in the embodiment of the lighting apparatus 10 shown, the first structure 112 is a first set of reflectors, namely a first reflector 132 and a second reflector 134, and the second structure 116 includes a second set of reflectors, namely a third reflector 136 and a fourth reflector 138. The reflectors may vary and may be substantially concave with a surface treatment, such as a plurality of reflective surfaces, to create reflection of light outward to at a specific point onto the road, making a proper beam pattern in front of the vehicle.

In embodiments, a plurality of light engines 140a-d are mounted to the apparatus 10, such as to the frame 100 or to the structures 112, 116, and are positioned adjacent to each reflector such that the light engines coordinate to reflectors to emit light thereon. The light engines 140*a-d* provide mounting locations and surfaces for mounting necessary electrical components, such as LEDs, circuit boards, etcetera.

Figure 5:
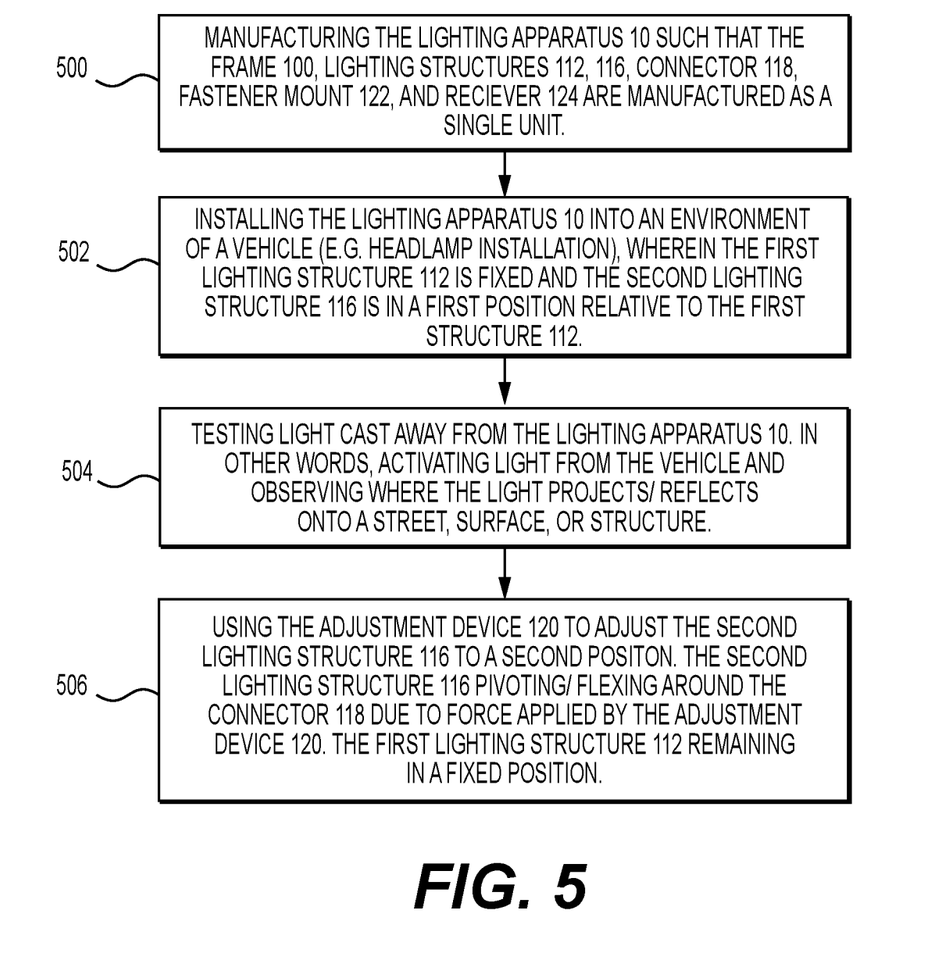
FIG. 5 is a flowchart of a method of using and adjusting the lighting apparatus of FIG. 1.

In FIG. 5, a flowchart reiterates the method of using the lighting apparatus 10. At step 500, the lighting apparatus 10 is manufactured, which includes selecting design specifications appropriate for an intended mounting environment (e.g. make and model of vehicle), and the apparatus 10 is manufactured with the frame 100, lighting structures 112, 116, connector 118, fastener mount 122, and receiver 124 as a single unit. In other words, these components are manufactured into an integral single body, such as through injection molding or other suitable manufacturing activities. The limited use of parts secured together improves efficiency associated with manufacturing the apparatus 10.

At step 502, the manufactured apparatus 10 is installed into the appropriate environment (e.g. as a headlamp into a vehicle), wherein the first lighting structure 112 is fixed relative to the frame 100 and the second lighting structure 116 is in a first position relative to the first lighting structure 112.

At step 504, the lighting apparatus 10 is tested. Specifically, light is activated, such that the light structures 112, 116 cast the light onto a surface such as a road, or onto a structure such as a building. Accordingly, the projection/reflection of light is observed and evaluated to determine if the positioning of the first and second structures 112, 116 are appropriate for use.

At step 506, in the event that the testing step reveals that adjustments are desired, the adjustment device 120 is used to make adjustments to the second lighting structure 116 such that the structure 116 is adjusted into a second position. As discussed above, the first lighting structure 112 remains fixed relative to the frame 100, and the adjustment device 120 is configured to apply or remove force to the second structure 116 such that it pivots or flexes about the connector 118 into the second position. In other words, the threaded fastener may be tightened or loosened as needed to make said adjustment. Steps 504 and 506 may be repeated any number of times to adjust the structure 116 into a needed position.

Those skilled in the art will appreciate the novel features of the present disclosure, namely the use of a flexible connector between two or more structures used for lighting, wherein the flexible connector allows for adjustment of one structure relative to the other, the other being in a fixed configuration. The adjustment device may vary but will provide for micro adjustability between the two structures, which in embodiments, is completed during a manufacturing stage.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A lighting apparatus for use with a vehicle, the lighting apparatus comprising:
    a frame forming an opening between at least a first side and a second side;
    a first lighting structure fixedly secured within the opening of the frame;
    a second lighting structure positioned within the opening and connected to the first lighting structure via a connector; and
    an adjustment device engaged with the second lighting structure, the adjustment device configured to apply force to the second lighting structure such that the connector flexes and allows the second lighting structure to adjust relative to the first lighting structure to move between a first position and a second position.

2. The lighting apparatus of claim 1, wherein the first lighting structure is integral with the frame, the first lighting structure connected to the frame on at least three sides.

3. The lighting apparatus of claim 1, wherein the first lighting structure is immovable relative to the frame.

4. The lighting apparatus of claim 1, wherein the connector further comprises a body positioned between the first lighting structure and the second lighting structure, the body having a first edge connected to the first lighting structure and a second edge connected to the second lighting structure, the body configured to flex as the second lighting structure is adjusted relative to the first lighting structure.

5. The lighting apparatus of claim 1, wherein the frame, the first lighting structure, the second lighting structure, and the connector are manufactured as a single unit.

6. The lighting apparatus of claim 1, wherein the adjustment device further comprises:
    a fastener mount extending from the frame;
    a receiver extending from the second lighting structure; and
    a threaded fastener extending between the receiver and the fastener mount;
    wherein rotation of the threaded fastener applies force to the second lighting structure.

7. The lighting apparatus of claim 6, wherein the frame, the first lighting structure, the second lighting structure, the connector, the fastener mount, and the receiver are manufactured as a single unit.

8. The lighting apparatus of claim 1, wherein the first lighting structure further comprises a first reflector positioned adjacent to a first light engine and a second reflector positioned adjacent to a second light engine, wherein the first reflector and the second reflector are configured to reflect light outward from the lighting apparatus.

9. A method of adjusting a lighting apparatus, the method comprising:
    manufacturing the lighting apparatus having a frame forming an opening between at least a first side and a second side, a first lighting structure fixedly secured within the opening of the frame, a second lighting structure positioned within the opening and connected to the first lighting structure via a connector, and an adjustment device engaged with the second lighting structure;
    installing the lighting apparatus into an environment of a vehicle, wherein the first lighting structure is in a fixed position relative to the frame and the second lighting structure is in a first position relative to the first lighting structure;
    testing the lighting apparatus by activating light and observing where the light is cast from the first lighting structure and the second lighting structure;
    adjusting the second lighting structure into a second position relative to the first lighting structure via the adjustment device, wherein the connector flexes due to force applied from the adjustment device through the second lighting structure and to the connector, thereby allowing the second lighting structure to move into the second position.

10. The method of claim 9, wherein manufacturing the lighting apparatus further comprises manufacturing the frame, the first lighting structure, the second lighting structure, and the connector into a single unit.

11. The method of claim 9, wherein the first lighting structure is integral with the frame and connected to the frame on at least three sides.

12. The method of claim 9, wherein the connector further comprises a body positioned between the first lighting structure and the second lighting structure, the body having a first edge connected to the first lighting structure and a second edge connected to the second lighting structure, the body configured to flex as the second lighting structure is adjusted relative to the first lighting structure.

13. The method of claim 9, wherein the adjustment device further comprises:

a fastener mount extending from the frame;
a receiver extending from the second lighting structure; and
a threaded fastener extending between the receiver and the fastener mount;
wherein rotation of the threaded fastener applies force to the second lighting structure.

14. The method of claim 13, wherein the frame, the first lighting structure, the second lighting structure, the connector, the fastener mount, and the receiver are manufactured as a single unit.

15. The method of claim 13, wherein adjusting the second lighting structure further comprises one selected from a group consisting of:

tightening the threaded fastener such that the fastener pulls the receiver toward the fastener mount; and
loosening the threaded fastener such that the fastener retracts the receiver away from the fastener mount.

* * * * *